United States Patent
Bankman et al.

(10) Patent No.: US 6,738,500 B2
(45) Date of Patent: May 18, 2004

(54) METHOD AND SYSTEM FOR DETECTING SMALL STRUCTURES IN IMAGES

(75) Inventors: Isaac N. Bankman, Columbia, MD (US); Lloyd W. Ison, Salt Lake City, UT (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/227,733

(22) Filed: Aug. 26, 2002

(65) Prior Publication Data

US 2003/0002737 A1 Jan. 2, 2003

Related U.S. Application Data

(63) Continuation of application No. 09/885,237, filed on Jun. 20, 2001, which is a continuation of application No. 08/960,549, filed on Oct. 31, 1997, now abandoned, which is a continuation of application No. 08/548,925, filed on Oct. 26, 1995, now abandoned.

(51) Int. Cl.[7] ................................................. G06K 9/00
(52) U.S. Cl. ...................................... 382/128; 382/133
(58) Field of Search ................................ 382/128, 132, 382/131, 133, 224, 225, 274; 128/922

(56) References Cited

U.S. PATENT DOCUMENTS 5,212,637 A * 5/1993 Saxena ................... 364/413.26

OTHER PUBLICATIONS

Bankman et al "Detection of Microcalcification Clusters using Neural Networks," Proc. 16[th]Annual Int. Conf. of IEEE Engeineering in Medicine and Biology Society, Nov. 1994 pp. 590–591.*

Hojjatoleslami et al, "Automatic Detection of Calcification in Mammograms," IEEE Proc. Int Conf. on Image Processing Applications, Jul. 1995, pp. 139–143.*

* cited by examiner

Primary Examiner—Yon J. Couso
(74) Attorney, Agent, or Firm—Francis A. Cooch

(57) ABSTRACT

The invention is a method and apparatus for automated detection of small structures in images. One specific use is to detect malignant microcalcification clusters in mammograms. A digitized and filtered mammogram image is stored in a computer. Seed pixels, which are pixels that are brighter than their immediate neighbors, are identified to indicate candidate structures and used to construct two regions. Various features are then measured using the two regions around each seed point. The features characterize each candidate structure and are input to a classifier, such as a neural network. The classifier then distinguishes between structures of interest and background. The structures detected by the classifier are then presented to a clustering algorithm. A detected structure that is less than a threshold distance away from the nearest structure and a cluster is included in that cluster. Finally, the results are displayed, either on a monitor or on hard copy, with a frame around the detected cluster.

25 Claims, 2 Drawing Sheets

METHOD AND SYSTEM FOR DETECTING SMALL STRUCTURES IN IMAGES

This application is a continuation of prior application Ser. No. 08/960,549, filed Oct. 31, 1997, which is a continuation of Ser. No. 08/548,925, filed Oct. 26, 1995, now abandoned.

STATEMENT OF GOVERNMENTAL INTEREST

The Government has rights in this invention pursuant to Contract No. N00039-94-C-0001 awarded by the Department of the Navy.

BACKGROUND OF THE INVENTION

The invention relates to image analysis and, more specifically, to a computer implemented method and system for the processing of digitized images to automatically detect structures of interest therein. In one application, the invention comprises a method and apparatus for detecting microcalcification clusters in mammograms.

Identification of small and low-contrast structures in images requires methods and systems for characterizing these structures and separating them from the background. One example requiring such methods and systems is the detection of microcalcifications in mammograms, indicating the possibility of a malignant tumor.

Breast cancer, by far the leading type of cancer incidence in women, causes about 170,000 new cases a year, more than double the amount caused by colorectal cancer, the second major type in women. However, early diagnosis and treatment of breast cancer provide one of the highest chances of survival among cancer types in women. The American Cancer Society recommends a yearly mammogram examination for asymptomatic women over the age of 35 and Medicare covers these procedures.

Awareness and willingness for prevention of breast cancer is rapidly increasing in the general public. Therefore, it is possible that mammography will soon be one of the highest volume X-ray procedures regularly used in radiology clinics. The increasing burden on radiologists is being experienced at many medical centers. A reliable computerized method and system can contribute both speed and accuracy to mammogram interpretation.

The first and sometimes the only mammographic sign in early, curable breast cancer is a cluster of microcalcifications that are visible in about 50% of breast cancer cases. Microcalcifications typically have a higher X-ray opacity than that of normal breast tissue and they appear as relatively brighter structures ranging from 0.1 mm to 2 mm in width in a mammogram. In visual inspection, one cluster of microcalcifications consists of 3 or more individual microcalcifications that appear in an area of about 1 $cm^2$.

Due to the subtlety of some microcalcifications, visual interpretation of a mammogram is a tedious process that generally requires a magnifying glass, and that, in some cases, can take more than 15 minutes. In visual inspection, the probability of false negatives is high and a significant level of false positives is reported, i.e., only one out of five cases that radiologists interpret as potential cancer is confirmed in a biopsy examination.

The factors that contribute to the difficulty of visually recognizing microcalcifications are their small size; their morphological variability; their similarity to other microstructures that are unrelated to cancer, e.g., film artifacts, lead shot positioning markers, and some benign tissue structures; and the relatively low contrast of mammograms.

For an automated, computerized method and system, the small size of microcalcifications does not pose a large problem because digitization resolutions (e.g., 25 microns/pixel) that provide adequate information on the smallest microcalcifications are available. However, the other three factors present challenges that successful automated systems have to meet.

Previously developed automated detection techniques reported varying levels of performance with different methods. See, H-P. Chan et al., "Computer-aided detection of microcalcifications in mammograms: methodology and preliminary clinical study," *Invest. Radiol.*, vol. 23, p. 664, 1988; B. W. Fam et al., "Algorithm for the detection of fine clustered calcifications on film mammograms," *Radiology*, vol., 169, p. 333, 1988; and D. H. Davies and D. R. Dance, "Automatic computer detection of clustered calcifications in digital mammograms," *Phys. Med. Biol.*, vol. 35, p. 1111, 1990.

The potential difficulties and pitfalls of many automated detection techniques can be summarized as follows:

a. Too little enhancement may preclude the detection of minor microcalcification peaks while too much enhancement may increase significantly the amplitude of small background structures (noise) and thus produce a large number of false detections. An acceptable compromise may not exist in some images, and in those images where it exists, it can change from image to image and can be difficult to determine.

b. A small, square region of analysis (moving kernel) where operational parameters are computed, may be inappropriate for the natural shape of microcalcifications and automated detection based on such approaches may depart considerably, in some cases, from the outcome of visual detection.

c. A large number of parameters whose values have to be entered manually (e.g., Fam) is not a viable approach for expedient clinical use.

Considering the limitations discussed above, any new detection method and apparatus has to meet the following requirements:

a. Operate on raw data (no enhancement) to ensure that both visual interpretation and automated detection use the same information.

b. Have an approach that is compatible with the natural morphology of microcalcifications, i.e., no use of small square areas of interest or moving kernels.

c. Require a minimal number of operational parameters that can be set adaptively and automatically for any image, allowing fully automated operation.

d. Allow for visual interpretability of operational parameters.

The above considerations, and the unsatisfactory results obtained with some of the available detection techniques, has led to the development of the fundamentally different detection method and apparatus described and claimed herein.

SUMMARY OF THE INVENTION

In generalized form, the invention is an image analysis method and apparatus implemented in a computer for automatically detecting small structures in images. The specific embodiment described below is useful as a diagnostic aid that determines, on a digitized mammogram, the location of clusters of microcalcifications whose morphological properties are similar to those observed in malignant microcalcification clusters confirmed by biopsy.

The invention first digitizes the mammogram and preprocesses the digitized image through a nonlinear filter that eliminates very high frequency noise. The resultant image is then stored in the form of a matrix in the memory of a data processing means/computer.

In the computer, the digitized image is segmented into candidate structures by first locating seed pixels, defined as pixels which are brighter than their immediate neighbors. Each seed pixel in the image is used as the basis for constructing/growing two regions. In the first region, adjacent pixels are added to the region if: (1) they have a gradient value higher than the pixels they adjoin (touch) in the grown region and (2) they have a gray level lower than the pixels they adjoin in the grown region. The second region is constructed/grown by adding adjacent pixels if they have a gray level lower than the pixels they adjoin in the grown region.

Following construction of the two regions, various features are measured using the two regions around each seed point. Certain of the features, taken together, characterize each candidate structure and are used as input to a classifier, such as a neural network. The classifier will then distinguish the candidate structures between structures of interest and background. The structures detected by the classifier will then be presented to a clustering algorithm. A detected structure that is less than a threshold distance from the nearest structure in a cluster is included in that cluster. Finally, the results are displayed either on a monitor or on hard copy with a frame around the detected cluster.

DETAILED DESCRIPTION

The method of the invention begins by digitizing each mammogram using, e.g., a Howtek D4000 drum scanner with a spatial resolution of 25 microns per pixel, an optical dynamic range of 3.5 O.D. units, and 4096 (12 bits) quantization levels. Digitized mammograms are then preprocessed by a nonlinear, 3×3 median filter to reduce the amount of very high frequency noise while retaining edge sharpness. The digitized mammograms are then stored in a computer in a memory in the form of a matrix $x(i,j)$.

Once stored in the computer memory, the digitized data is processed/analyzed using the computer in the following manner:

a. Structure Segmentation:

Step 1. The digitized image is segmented by the computer into candidate structures. The location of a candidate structure is initially determined with a local maximum of intensity. Each pixel that is higher in value than all of its immediate neighbors is considered a local intensity maximum and used as a seed pixel $s(i,j)$ for segmentation. The immediate neighborhood is defined as those pixels contained in a small region centered around the tested pixel.

Step 2. The gradient image $g(i,j)$ is formed by computing the local gradient at each pixel in the image. (Note, forming the gradient image can be done before Step 1 above.)

Figure 1:
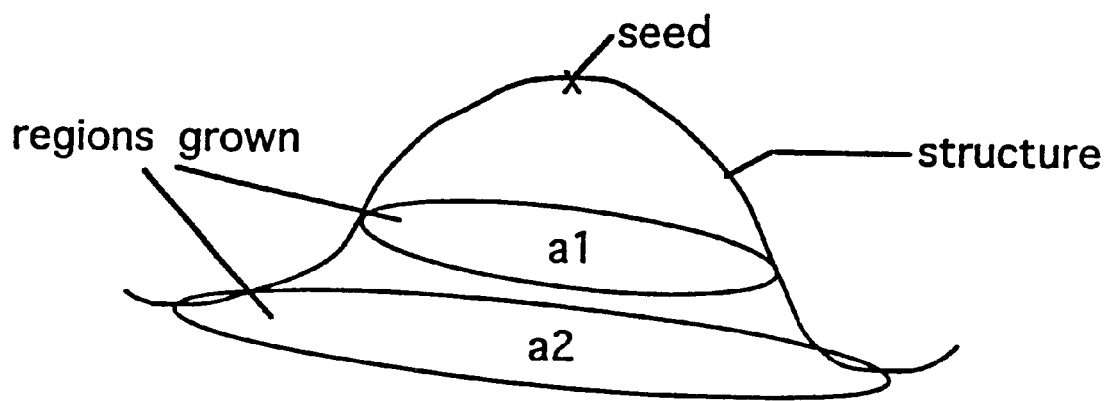
FIG. 1 illustrates areas of the first and second regions (a1 and a2) used to measure features in the invention.
Figure 2:
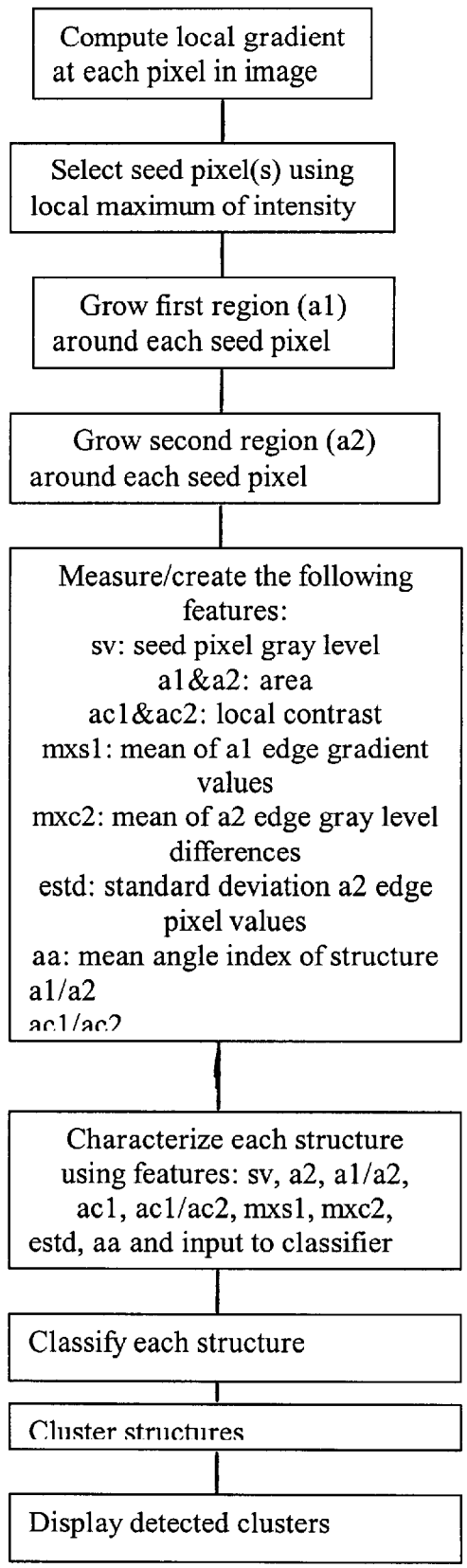
FIG. 2 illustrates the steps of the method of the invention.

Step 3. As shown in FIG. 1, around each seed pixel a first region (a1) is grown/constructed by using the seed pixel and its 8 neighbors as starting points. Adjacent pixels are added to the region if: (1) they have a gradient value higher than the pixels they adjoin in the region grown so far, and (2) they have a gray level lower than pixels they adjoin in the grown region. This first region extends to the pixels with the highest local intensity change (local contrast). The edge of the first region is the immediate closed contour with the highest sharpness around the seed pixel.

Step 4. Around each seed pixel a second region (a2), also shown in FIG. 1, is grown/constructed using the seed pixel and its 8 neighbors. Adjacent pixels are added to the region if they have a gray level value lower than the pixels they adjoin in the region grown so far. This second region extends to pixels with the highest intensity difference from the seed pixel. The edge of the second region is the immediate closed contour at the level of surrounding background, i.e., the edge of the segmented candidate structure.

b. Feature Extraction:

Step 5. Using the two regions around each seed point, several measurements are made:
1. The gray level value of the seed pixel (sv).
2. The areas of regions 1 and 2 in pixels (a1 and a2).
3. The local contrast obtained by subtracting the mean value of pixels along the edge of region 1 from the seed value (ac1). The same measurement along the edge of region 2 (ac2).
4. The mean of the higher 50 percentile of gradient values along the edge of region 1 (mxs1).
5. The gray level differences between the seed value and each pixel along the edge of region 2 are calculated. The mean value of the higher 50 percentile of these differences is computed (mxc2).
6. The standard deviation of pixel values along the edge of region 2 (estd).
7. An angle index is measured for pixels on the 4 (North, East, South, West) or 8 directions that radiate from the seed. In each direction a line of pixels that extends several pixels beyond the edge of region 2 is used. For each pixel $x(m,n)$ on each direction the computed index $r(m,n)$ is the ratio obtained by dividing the difference between the seed value $s(i,j)$ and value of $x(m,n)$ by the distance in pixels between $s(i,j)$ and $x(m,n)$. The maximal value of $r(m,n)$ on each direction is found and normalized with a factor that depends on the digitization range. The arctangent of these normalized maximal values are averaged to find the mean angle index of the structure (aa).

Step 6. At least two additional features are created using the measured features, i.e., the area of the first region divided by the area of the second region (a1/a2) and the local contrast of the first region divided by the local contrast of the second region (ac1/ac2).

Step 7. Each structure is characterized by selecting the following 9 features that are used as the input to a classifier:

sv, a2, a1/a2, ac1, ac1/ac2, mxs1, mxc2, estd, aa.

c. Classification and Clustering:

Step 8. A classifier, such as a neural network, and, in one embodiment, a feedforward neural network, is trained to distinguish between structures to be recognized and background, using examples of both. Structures detected by the neural network are presented to a clustering algorithm. A detected structure that is less than a distance threshold away from the nearest structure in a cluster is included in that cluster.

Step 9. The results are displayed either on a monitor screen or on hard copy, with a frame around the detected clusters.

While the discussion above focuses on detection of microcalcification clusters in mammograms, the method/apparatus of the invention obviously has application to a broader range of image analysis. In fact, the invention can be used to detect objects in many different types of images, e.g., tomographic images.

The invention is a method/apparatus to assist radiologists in determining the location of suspicious clusters. The invention will permit investigation of the subtle signs of early breast cancer that may be overlooked visually. The inherent advantages of an automated detection system, which include spatial resolution exceeding human vision and consistent quantitative measurements, will increase the accuracy of mammographic interpretation.

We claim:

1. A method for detecting a structure in an image, the method comprising the steps of:
    digitizing the image;
    storing the digitized image in a memory of a data processing means;
    detecting automatically the structure using the data processing means and the digitized image comprising the steps of:
        segmenting the digitized image into a candidate structure to be classified comprising the steps of:
            locating a seed pixel in the digitized image, the seed pixel having a higher intensity value than its neighboring pixels;
            forming a gradient image of the digitized image;
            constructing a first region beginning with the seed pixel and its neighboring pixels by adding to the first region all adjacent pixels having both a gradient value higher and a gray level lower than the pixels already in the first region that the adjacent pixels adjoin; and
            constructing a second region beginning with the seed pixel and its neighboring pixels by adding to the second region all adjacent pixels having a gray level value lower than the pixels already in the second region that the adjacent pixels adjoin; and
        extracting features from the candidate structure;
        characterizing the candidate structure using the features; and
        classifying the candidate structure, using the extracted features, as structure or as back ground; and
    indicating the location of the structure in the image.

2. The method as recited in claim 1, wherein the candidate structure is classified using a neural network.

3. The method as recited in claim 2, wherein the neural network is a feedforward neural network.

4. The method as recited in claim 1, further comprising the step of clustering the classified structures that are a threshold distance from each other in the digitized image.

5. The method as recited in claim 1, the extracting features step comprising the step of measuring the standard deviation of pixel values along the edge of the second region (estd).

6. The method as recited in claim 1, the extracting features step comprising the step of measuring a gray level value of the seed pixel (sv).

7. The method as recited in claim 5, the extracting features step further comprising the step of measuring a gray level value of the seed pixel (sv).

8. The method as recited in claim 1, the extracting features step comprising the step of measuring an area of the first region in pixels (a1).

9. The method as recited in claim 7, the extracting features step further comprising the step of measuring an area of the first region in pixels (a1).

10. The method as recited in claim 1, the extracting features step comprising the step of measuring an area of the second region in pixels (a2).

11. The method as recited in claim 9, the extracting features step further comprising the step of measuring an area of the second region in pixels (a2).

12. The method as recited in claim 1, the extracting features step comprising the step of measuring a local contrast obtained by subtracting the mean value of pixels along the edge of the first region from the seed pixel value (ac 1).

13. The method as recited in claim 11, the extracting features step further comprising the step of measuring a local contrast obtained by subtracting the mean value of pixels along the edge of the first region from the seed pixel value (acl).

14. The method as recited in claim 1, the extracting features step comprising the step of measuring a local contrast obtained by subtracting the mean value of pixels along the edge of the second region from the seed pixel value (ac2).

15. The method as recited in claim 13, the extracting features step further comprising the step of measuring a local contrast obtained by subtracting the mean value of pixels along the edge of the second region from the seed pixel value (ac2).

16. The method as recited in claim 1, the extracting features step comprising the step of measuring the mean value of the higher fifty percentile of the gradient values of the pixels along the edge of the first region (mxs1).

17. The method as recited in claim 15, the extracting features step further comprising the step of measuring the mean value of the higher fifty percentile of the gradient values of the pixels along the edge of the first region (mxs1).

18. The method as recited in claim 1, the extracting features step comprising the step of measuring the mean value of the higher fifty percentile of the gray level differences between the seed pixel value and each pixel along the edge of the second region (mxc2).

19. The method as recited in claim 17, the extracting features step further comprising the step of measuring the mean value of the higher fifty percentile of the gray level differences between the seed pixel value and each pixel along the edge of the second region (mxc2).

20. The method as recited in claim 1, the extracting features step comprising the step of measuring the mean angle index of the structure (aa).

21. The method as recited in claim 19, the extracting features step further comprising the step of measuring the mean angle index of the structure (aa).

22. The method as recited in claim 21, the extracting features step further comprising the step of dividing the area of the first region by the area of the second region (a1/a2).

23. The method as recited in claim 22, the extracting features step further comprising the step of dividing the local contrast of the first region by the local contrast of the second region (ac1/ac2).

24. The method as recited in claims 23, the characterizing the candidate structure comprising the step of selecting the sv, a2, a1/a2, acl, acl/ac2, mxsl, mxc2, estd, and aa features to characterize the candidate structure.

25. The method as recited in claim 24, wherein the image is a mammogram and the structure is a microcalcification.

* * * * *